United States Patent
Shin et al.

(10) Patent No.: US 12,500,257 B2
(45) Date of Patent: Dec. 16, 2025

(54) IONIC CONDUCTIVITY MEASUREMENT DEVICE AND METHOD FOR FUEL CELL

(71) Applicants: HYUNDAI MOTOR COMPANY, Seoul (KR); KIA CORPORATION, Seoul (KR)

(72) Inventors: Sung Hee Shin, Incheon (KR); Jee Youn Hwang, Seoul (KR); Won Jae Choi, Seoul (KR); Yun Su Lee, Uiwang-si (KR); Da Hee Kwak, Suwon-si (KR); Hyoun Myung Park, Incheon (KR); Si Won Kim, Gunpo-si (KR); Ah Hyeon Park, Suwon-si (KR); Ji Hoon Jang, Suwon-si (KR); Songi Oh, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 478 days.

(21) Appl. No.: 18/085,252

(22) Filed: Dec. 20, 2022

(65) Prior Publication Data
US 2023/0253592 A1 Aug. 10, 2023

(30) Foreign Application Priority Data
Feb. 10, 2022 (KR) .................. 10-2022-0017251

(51) Int. Cl.
*H01M 8/1004* (2016.01)
*H01M 8/04858* (2016.01)

(52) U.S. Cl.
CPC ..... *H01M 8/1004* (2013.01); *H01M 8/04952* (2016.02)

(58) Field of Classification Search
CPC .. H01M 8/04952; H01M 8/1004; Y02E 60/50
See application file for complete search history.

(56) References Cited

U.S. PATENT DOCUMENTS

| 9,291,645 B2 | 3/2016 | Matsui et al. |
| 10,877,085 B2 | 12/2020 | Kanai et al. |

FOREIGN PATENT DOCUMENTS

| JP | 2006286397 A | 10/2006 |
| JP | 2010271291 A | 12/2010 |

OTHER PUBLICATIONS

Machine translation JP2006286397A (Year: 2006).*
WonATech Co., Ltd. Technical Description of Through-Plane Conductivity Test Jig.

* cited by examiner

*Primary Examiner* — Victoria H Lynch
(74) *Attorney, Agent, or Firm* — MCDONNELL BOEHNEN HULBERT & BERGHOFF LLP

(57) ABSTRACT

Disclosed are an ionic conductivity measurement device and method for a fuel cell, which enable accurate measurement of ionic conductivity of a membrane electrode assembly for a fuel cell under various conditions. The ionic conductivity measurement device includes a main body frame, a clamp handle mounted to the upper portion of the main body frame, a lift shaft connected to the clamp handle so as to be movable upwards and downwards, a motion jig mounted to the main body frame so as to be movable upwards and downwards and including an upper support frame connected to the lower end of the lift shaft and a specimen support frame connected to the upper support frame, a lower support frame mounted to the lower end portion of the main body frame, an upper probe pin mounted to the upper support frame, and a lower probe pin mounted to the lower support frame.

14 Claims, 10 Drawing Sheets

IONIC CONDUCTIVITY MEASUREMENT DEVICE AND METHOD FOR FUEL CELL

CROSS-REFERENCE TO RELATED APPLICATION

This application claims under 35 U.S.C. § 119(a) the benefit of priority from Korean Patent Application No. 10-2022-0017251 filed on Feb. 10, 2022, the entire contents of which are incorporated herein by reference.

BACKGROUND

(a) Technical Field

The present disclosure relates to an ionic conductivity measurement device and method for a fuel cell, and more particularly to an ionic conductivity measurement device and method for a fuel cell which enables accurate measurement of ionic conductivity of a membrane electrode assembly for a fuel cell under various conditions.

(b) Background Art

In general, a fuel cell includes a membrane electrode assembly (MEA), which includes a polymer electrolyte membrane, through which hydrogen ions (protons) are transported, and catalyst layers, which are applied to both surfaces of the electrolyte membrane and in which a reaction between hydrogen and oxygen occurs, i.e. a cathode and an anode, which are electrode layers.

In addition, a gas diffusion layer (GDL), through which gas, such as hydrogen and air, diffuses and moves, and a separator, which has flow paths for supplying hydrogen and air to the catalyst layers and discharging water generated by an electricity generation reaction, are sequentially stacked on the outer side of each of the cathode and the anode.

Hydrogen is oxidized in the anode of the fuel cell to produce hydrogen ions and electrons. The resulting hydrogen ions travel to the cathode through the electrolyte membrane, and the resulting electrons travel to the cathode through a conductive wire.

In the cathode, which receives the hydrogen ions and the electrons from the anode, an oxygen reduction reaction occurs, and water is produced. Electrical energy is generated by flow of the electrons through the conductive wire and flow of the protons through the polymer electrolyte membrane.

A fuel cell stack, which is mountable in a fuel cell vehicle, is produced by stacking hundreds or more of unit cells, in each of which gas diffusion layers and separators are sequentially stacked on a membrane electrode assembly, on one another and coupling end plates to both ends of the stacked assembly of the unit cells.

The surface pressure for clamping of the components of the fuel cell stack is determined by the pressure at which the end plates are coupled.

The surface pressure for securing airtightness of each of the membrane electrode assemblies of the fuel cell stack acts across a thickness due to the pressure with which the end plates are coupled. The ionic conductivity of the electrolyte membrane, which is an ion exchange membrane, and the electrode layers of the membrane electrode assembly may vary depending on the surface pressure.

Therefore, there is need for a method of measuring ionic conductivity, which varies depending on the amount of surface pressure acting on a membrane electrode assembly in a thickness direction.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the related art, and it is an object of the present disclosure to provide an ionic conductivity measurement device and method for a fuel cell, which enable measurement of ionic conductivity in the thickness direction of an electrolyte membrane and electrode layers of a membrane electrode assembly, which constitutes a fuel cell stack, under various conditions, for example, under different pressure conditions, and enable the result of the measurement to be effectively used for the manufacture of the membrane electrode assembly and the fuel cell stack.

In one aspect, the present disclosure provides an ionic conductivity measurement device for a fuel cell, including a main body frame mounted onto a lower base frame so as to stand upright, a plurality of clamp handles mounted to the upper end portion of the main body frame, a lift shaft connected to each of the clamp handles so as to be movable upwards and downwards, a motion jig mounted to the main body frame so as to be movable upwards and downwards and including an upper support frame connected to the lower end portion of the lift shaft and a specimen support frame integrally connected to the upper support frame, a lower support frame mounted and fixed to the lower end portion of the main body frame, an upper probe pin mounted to the upper support frame and configured to be brought into contact with the upper surface of a specimen seated on the specimen support frame when the upper support frame is moved downwards, and a lower probe pin mounted to the lower support frame and configured to be in contact with the lower surface of the specimen seated on the specimen support frame.

In a preferred embodiment, each of the plurality of clamp handles may include a handle portion configured so as to be gripped by a user, an upper hinge end extending from the handle portion and hinged to the main body frame, and a lower hinge end branching from the upper hinge end and hinged to the upper end portion of the lift shaft.

In another preferred embodiment, the ionic conductivity measurement device may further include a guide pipe mounted on the front surface of the upper portion of the main body frame to guide upward and downward movement of the lift shaft.

In still another preferred embodiment, the main body frame may have a through-hole formed therein to guide upward and downward movement of the motion jig.

In yet another preferred embodiment, the motion jig may further include a lift plate integrally interconnecting the upper support frame and the specimen support frame, and the lift plate may extend through the through-hole and may be located on the rear surface of the main body frame.

In still yet another preferred embodiment, the ionic conductivity measurement device may further include a slide shaft mounted on the rear surface of the main body frame so as to be oriented in the vertical direction to guide upward and downward movement of the lift plate, and the lift plate may have a slide hole formed therein to allow the slide shaft to be inserted thereinto.

In a further preferred embodiment, the ionic conductivity measurement device may further include a ball plunger mounted in the lift plate and a plurality of fixing recesses formed in the rear surface of the main body frame so as to be spaced apart from each other at predetermined intervals in the vertical direction. The ball plunger may be selectively inserted into one of the plurality of fixing recesses.

In another further preferred embodiment, the specimen support frame may have a coin cell seating recess formed therein to allow a coin cell, configured to fix and protect the specimen, to be seated therein.

In still another further preferred embodiment, the coin cell may include a case, which is seated in the coin cell seating recess and has an open upper portion, a support surface formed on the periphery of the bottom thereof to allow the specimen, which is an ion exchange membrane having electrodes applied to both surfaces thereof, to be seated thereon, and a lower exposure hole formed in the center of the bottom thereof to expose the lower surface of the specimen, and a cap, which has a fixing end, formed on the lower surface thereof so as to be inserted into the case to press and fix the periphery of the specimen, and an upper exposure hole, formed in the center thereof to expose the upper surface of the specimen.

In yet another further preferred embodiment, the specimen support frame may have an insertion hole formed therein to allow the upper end portion of the lower probe pin to be inserted thereinto so as to come into contact with the lower surface of the specimen.

In still yet another further preferred embodiment, the upper probe pin may include an upper barrel formed to be hollow and to penetrate the upper support frame in the vertical direction so as to move upwards and downwards together with the upper support frame, an upper plunger having an upper end portion inserted into the lower portion of the upper barrel and a lower end portion having upper teeth formed thereon to minimize contact resistance with the specimen, an upper spring inserted into the upper portion of the upper barrel to elastically support the upper surface of the upper plunger, and an upper current-collecting bar connected to the upper end portion of the upper plunger so as to be in conductive contact with the upper end portion of the upper spring.

In a still further preferred embodiment, the upper spring may be compressed between the upper plunger and the upper current-collecting bar by downward movement force of the upper barrel and the upper current-collecting bar when the upper support frame is moved downwards in a state of contact of the upper teeth of the upper plunger with the specimen, and may be made of heat-resistant stainless steel.

In a yet still further preferred embodiment, the lower probe pin may include a lower barrel formed to be hollow and to penetrate the lower support frame in the vertical direction so as to be fixedly mounted thereto, a lower plunger having a lower end portion inserted into the upper portion of the lower barrel and an upper end portion having lower teeth formed thereon to minimize contact resistance with the specimen, a lower spring inserted into the lower portion of the lower barrel to elastically support the lower surface of the lower plunger, and a lower current-collecting bar connected to the lower end portion of the lower plunger so as to be in conductive contact with the lower end portion of the lower spring.

In a yet still further preferred embodiment, the lower spring may be compressed between the lower plunger and the lower current-collecting bar by force of pressing the lower plunger when the specimen support frame is moved downwards in a state of contact of the lower teeth of the lower plunger with the specimen, and may be made of heat-resistant stainless steel.

In another aspect, the present disclosure provides an ionic conductivity measurement method for a fuel cell, including seating specimens for measurement of ionic conductivity, having mutually different thicknesses, on respective ones of a plurality of specimen support frames, bringing a lower plunger of a lower probe pin, mounted to a lower support frame of a main body frame, into close contact with the lower surface of each of the specimens, pivoting a clamp handle to move a lift shaft downwards and to thereby move a motion jig downwards, bringing an upper plunger of an upper probe pin, mounted to an upper support frame of the motion jig, into close contact with the upper surface of each of the specimens, adjusting the amount of pressure applied to each of the specimens by adjusting the extent of downward movement of the upper plunger in a state of contact of the lower plunger with the lower surface of each of the specimens, and measuring ionic conductivity of each of the specimens at the adjusted amount of pressure.

In a preferred embodiment, the adjusting the amount of pressure applied to each of the specimens may include selectively inserting a ball plunger, mounted in a lift plate of the motion jig, into one of a plurality of fixing recesses formed in the rear surface of the main body frame.

In another preferred embodiment, the measuring ionic conductivity may include measuring a resistance value of an ion exchange membrane included in each of the specimens when current is applied to each of the specimens through the upper probe pin and the lower probe pin.

In still another preferred embodiment, the ionic conductivity may be calculated by an electrochemical analyzer, connected to the upper probe pin and to the lower probe pin, using the following equation:

$$\sigma(S/cm) = \frac{t(cm)}{R(\Omega)A(cm^2)}$$

where σ represents the ionic conductivity, t represents the thickness of each of the specimens, R represents resistance, and A represents the area of each of the specimens.

In yet another preferred embodiment, the ionic conductivity measurement method may further include calculating surface pressure acting on each of the specimens to estimate clamping surface pressure of a fuel cell stack including a membrane electrode assembly.

In still yet another preferred embodiment, the surface pressure acting on each of the specimens may be calculated using the following equation:

$$P_A(kg/cm^2) = \frac{k(N/mm) \times \delta(mm)}{A(m^2)} \times 1.0197 \times 10^5 \left(\frac{kg/cm^2}{N/m^2}\right)$$

where $P_A$ represents the surface pressure, k represents a spring constant of each of springs mounted in the upper probe pin and the lower probe pin, δ represents a deflection of each of the springs mounted in the upper probe pin and the lower probe pin, and A represents the area of each of the specimens.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
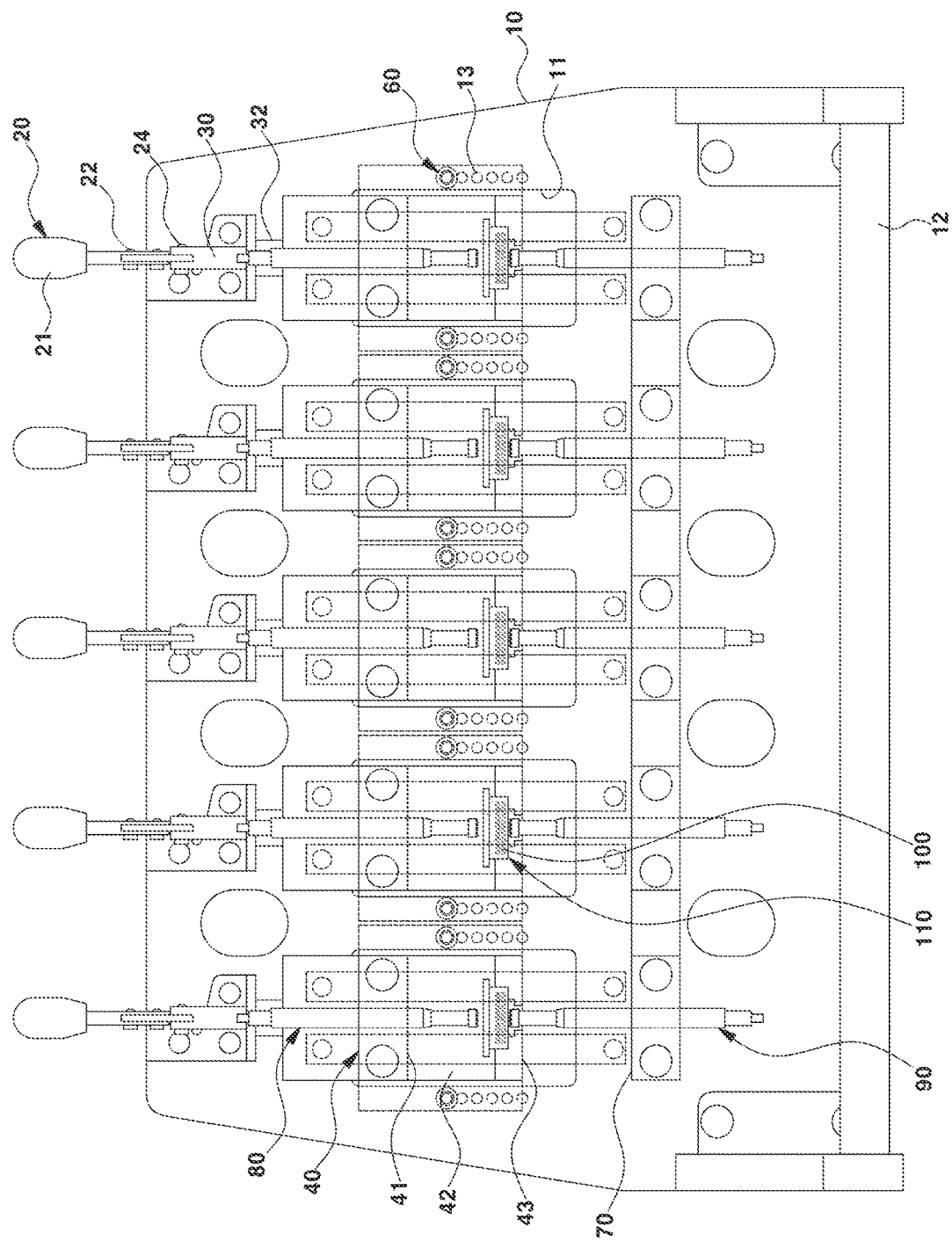
FIG. 1 is a front view showing an ionic conductivity measurement device for a fuel cell according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below.

Figure 2:
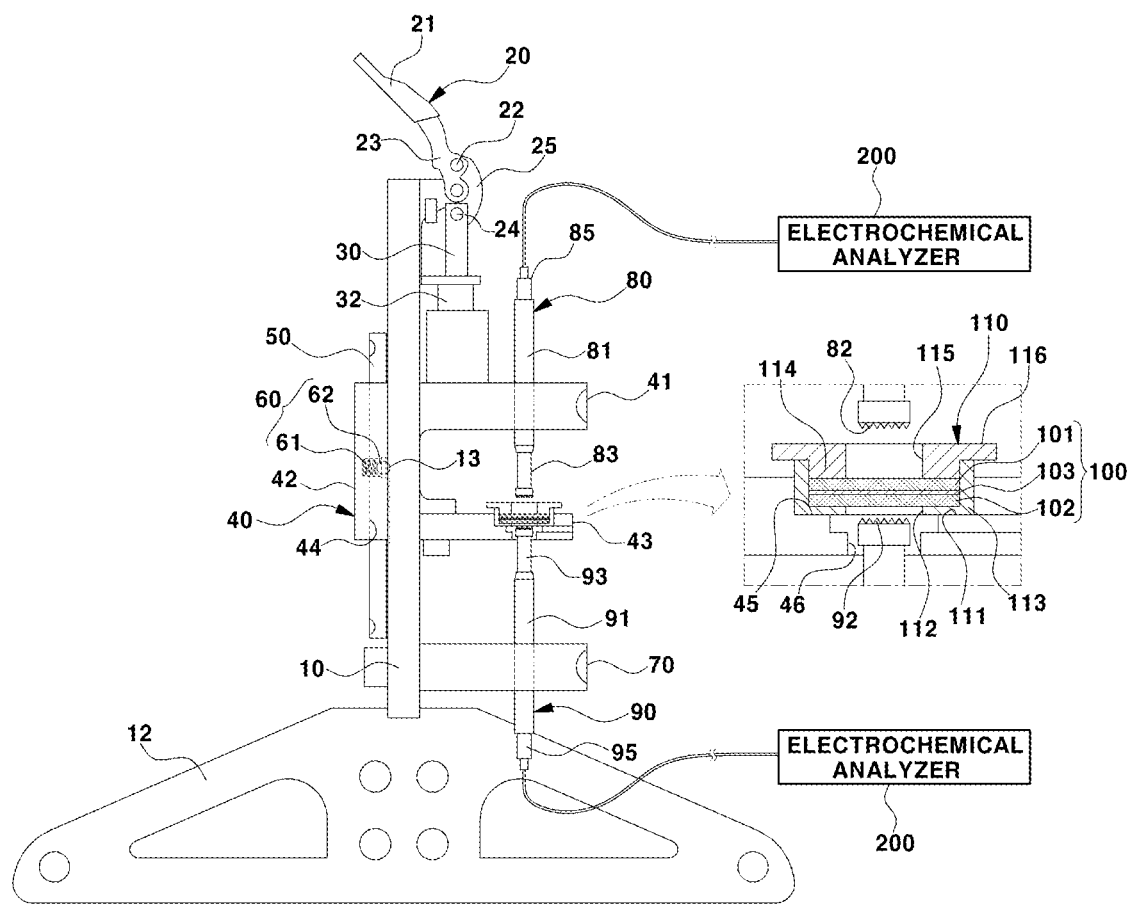
FIG. 2 is a cross-sectional view showing the operation of the ionic conductivity measurement device for a fuel cell according to the present disclosure.
Figure 3:
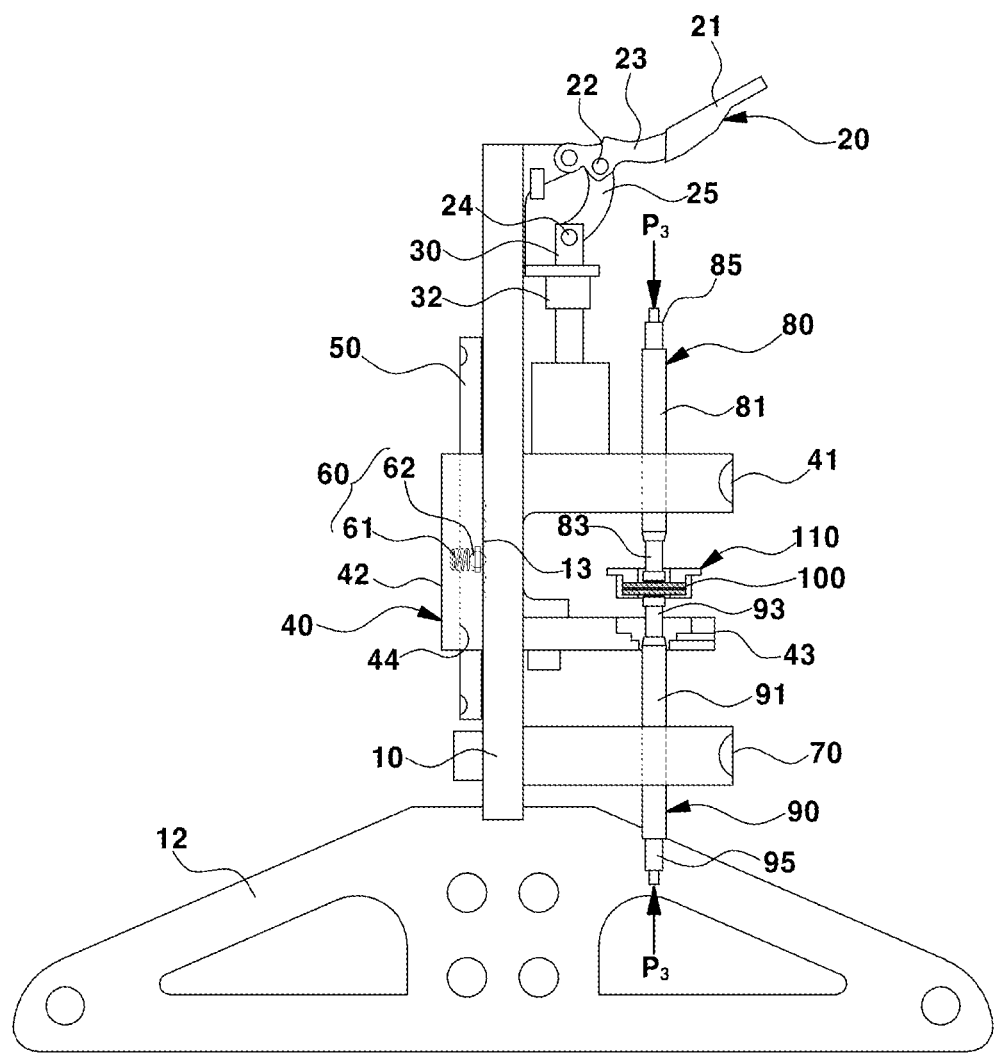
FIG. 3 is a cross-sectional view sequentially showing the operation of the ionic conductivity measurement device for a fuel cell according to the present disclosure.
Figure 4:
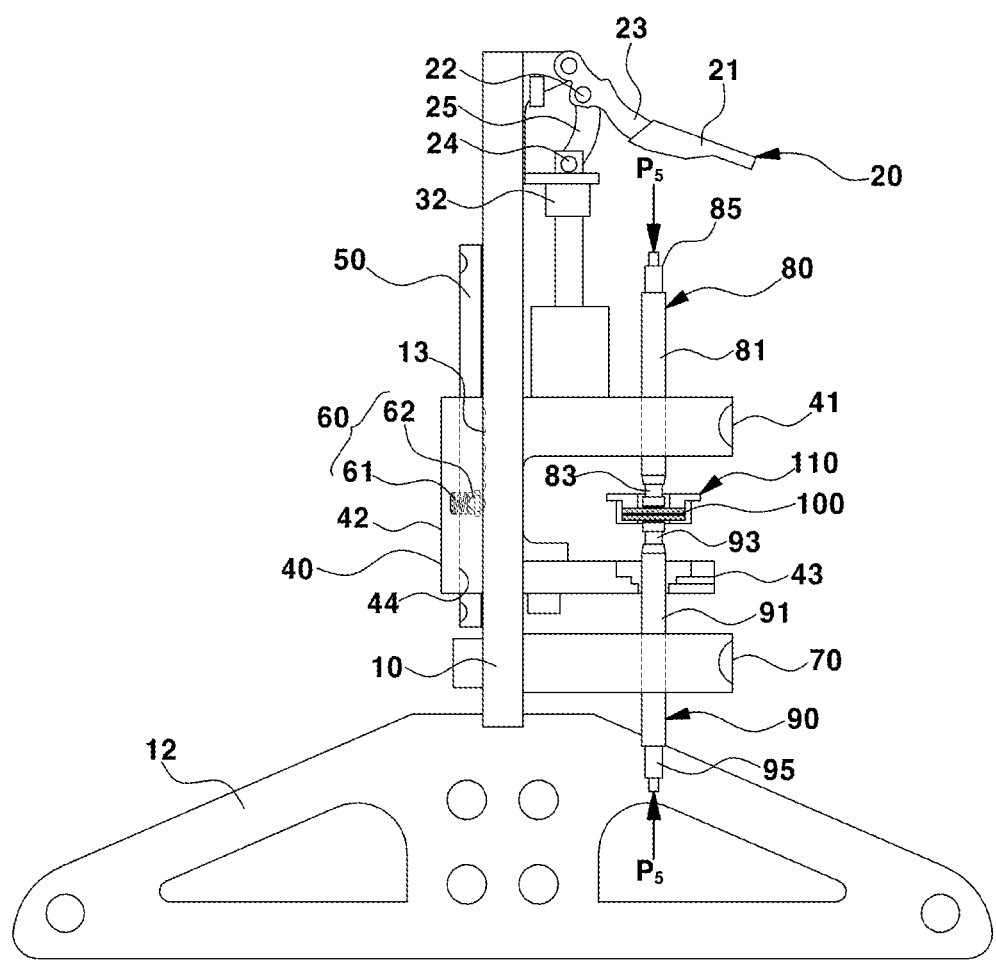
FIG. 4 is a cross-sectional view sequentially showing the operation of the ionic conductivity measurement device for a fuel cell according to the present disclosure.

FIG. 1 is a front view showing an ionic conductivity measurement device for a fuel cell according to the present disclosure, and FIGS. 2 to 4 are cross-sectional views sequentially showing the operation of the ionic conductivity measurement device for a fuel cell according to the present disclosure. In each drawing, reference numeral 10 designates a main body frame.

The main body frame 10 is a part to which various components for measuring ionic conductivity are mounted. The main body frame 10 is mounted onto a lower base frame 12, which is supported on the ground, so as to stand upright.

A clamp handle 20 is mounted on the front surface of the upper end portion of the main body frame 10 so as to be pivotable in the vertical direction. When measuring the ionic conductivity of a specimen 100, a user may directly hold and pivot the clamp handle 20.

Preferably, the specimen 100 may be an electrolyte membrane 103, which is an ion exchange membrane having electrode layers 101 and 102 applied to both surfaces thereof.

A lift shaft 30 is connected to the clamp handle 20 so as to be movable upwards and downwards.

To this end, a hollow guide pipe 32 is mounted on the front surface of the upper portion of the main body frame 10, specifically, at a position directly below the clamp handle 20, in order to guide the upward and downward movement of the lift shaft 30.

The clamp handle 20 includes a handle portion 21, which is formed so as to be gripped by the user, an upper hinge end 23, which extends from the handle portion 21 and is hinged to the main body frame via a first hinge pin 22, and a lower hinge end 25, which branches from the upper hinge end 23 and is hinged to the upper end portion of the lift shaft 30 via a second hinge pin 24.

When the handle portion 21 of the clamp handle 20 is pivoted to the uppermost position, the lift shaft 30 is moved to the uppermost position, as shown in FIG. 2.

When the handle portion 21 of the clamp handle 20 is pivoted downwards, the upper hinge end 23 and the lower hinge end 25 are pivoted downwards to push the lift shaft 30 downwards, whereby the lift shaft 30 is moved vertically downwards, as shown in FIGS. 3 and 4.

A motion jig 40, which is mounted to the main body frame 10 so as to be movable upwards and downwards, is connected to the lower end portion of the lift shaft 30.

In further detail, the motion jig 40 includes an upper support frame 41, which is connected to the lower end portion of the lift shaft 30 and has a horizontal plate shape, a specimen support frame 43, which is integrally connected to the upper support frame 41 and has a horizontal plate shape, and a lift plate 42, which integrally interconnects the rear end portion of the upper support frame 41 and the rear end portion of the specimen support frame 43 and has a vertical plate shape. The motion jig 40 configured as described above is mounted to the main body frame 10 so as to be movable upwards and downwards.

The main body frame 10 has a through-hole 11 formed therein to have a predetermined size in order to guide upward and downward movement of the motion jig 40 and to secure space for the motion jig 40 to move upwards and downwards.

Accordingly, the upper support frame 41 and the specimen support frame 43 of the motion jig 40 may protrude in the forward direction of the main body frame 10, and the lift plate 42 may protrude in the backward direction of the main body frame 10 through the through-hole 11.

Although the motion jig 40 is disposed so as to be movable upwards and downwards in the through-hole 11 in the main body frame 10, a structure for guiding upward and downward movement of the motion jig 40 is provided.

To this end, a slide shaft 50 for guiding upward and downward movement of the lift plate 42 is mounted on the rear surface of the main body frame 10 so as to be oriented in the vertical direction, and a slide hole 44, into which the slide shaft 50 is inserted, is formed in the lift plate 42. Accordingly, the lift plate 42 may be moved upwards and downwards along the slide shaft 50, and consequently, the motion jig 40, which includes the lift plate 42, the upper support frame 41, and the specimen support frame 43, may be moved upwards and downwards.

In addition, a structure for fixing the motion jig 40 at a desired height when the motion jig 40 is moved upwards and downwards is needed.

To this end, ball plungers 60 are mounted in the lift plate 42 at positions near both sides of the lift plate 42. Each of the ball plungers 60 includes a spring 61 and a ball 62 elastically supported by the spring 61. The main body frame 10 has a plurality of fixing recesses 13 formed in the rear surface thereof to allow the ball 62 of the ball plunger 60 to be selectively inserted thereinto. The fixing recesses 13 are disposed so as to be spaced apart from each other at predetermined intervals in the vertical direction.

When the ball 62 of the ball plunger 60 is selectively inserted into one of the plurality of fixing recesses 13, the pressure that is applied to the specimen 100 seated on the specimen support frame 43 may be determined, which will be described later.

In other words, the pressure that is applied to the specimen 100 may vary depending on which one of the plurality of fixing recesses 13 the ball 62 of the ball plunger 60 is inserted into.

The specimen support frame 43 has a coin cell seating recess 45 formed therein to allow a coin cell 110 for fixing and protecting the specimen 100 to be seated therein. As will be described later, the specimen support frame 43 has an insertion hole 46 formed therein to allow the upper end portion of a lower probe pin 90 to be inserted thereinto so as to come into contact with the lower surface of the specimen 100. The insertion hole 46 is formed in the bottom of the coin cell seating recess 45.

Preferably, the coin cell 110 has a structure for fixing the specimen 100 while exposing the upper surface and the lower surface of the specimen 100. The coin cell 110 includes a case 113 and a cap 116, which are coupled to each other.

The case 113 of the coin cell 110 is seated in the coin cell seating recess 45. The case 113 of the coin cell 110 may have an open upper portion, a support surface 111 formed on the periphery of the bottom thereof to allow the specimen 100, i.e. the electrolyte membrane 103, which is an ion exchange membrane having the electrode layers 101 and 102 applied to both surfaces thereof, to be seated thereon, and a lower exposure hole 112 formed in the center of the bottom thereof to expose the lower surface of the specimen 100.

The cap 116 of the coin cell 110 may have a fixing end 114, formed on the lower surface thereof so as to be inserted into the case 113 to press and fix the periphery of the specimen 100, and an upper exposure hole 115, formed in the center thereof to expose the upper surface of the specimen 100.

Accordingly, when the coin cell 110 is inserted into and seated in the coin cell seating recess 45 in the specimen support frame 43, the upper surface of the specimen 100 in the coin cell 110 may be exposed upwards through the upper exposure hole 115, and the lower surface of the specimen 100 in the coin cell 110 may be exposed downwards through the lower exposure hole 112.

In addition, a lower support frame 70, which has a horizontal plate shape, is fixedly mounted to the lower end portion of the main body frame 10.

In addition, an upper probe pin 80 is mounted to the upper support frame 41. When the upper support frame 41 is moved downwards, the upper probe pin 80 is brought into contact with the upper surface of the specimen 100 located on the specimen support frame 43. In addition, a lower probe pin 90 is mounted to the lower support frame 70. The lower probe pin 90 is in contact with the lower surface of the specimen 100 located on the specimen support frame 43.

As can be easily seen from FIGS. 5 to 8, the upper probe pin 80 may include an upper barrel 81, which is hollow and penetrates the upper support frame 40 in the vertical direction so as to move upwards and downwards together with the upper support frame 41, an upper plunger 83, which has an upper end portion inserted into the lower portion of the upper barrel 81 and a lower end portion having upper teeth 82 formed thereon to minimize contact resistance with the specimen 100, an upper spring 84, which is inserted into the upper portion of the upper barrel 81 to elastically support the upper surface of the upper plunger 83, and an upper current-collecting bar 85, which is connected to the upper end portion of the upper plunger 83 so as to be in conductive contact with the upper end portion of the upper spring 84.

The upper spring 84 is compressed between the upper plunger 83 and the upper current-collecting bar 85 by the force with which the upper barrel 81 and the upper current-collecting bar 85 are moved downwards together by downward movement of the upper support frame 41 in the state in which the upper teeth 82 of the upper plunger 83 are in contact with the specimen 100. Preferably, the upper spring 84 may be made of stainless steel having the same heat resistance and acid resistance as the upper probe pin 80 so as to withstand high-temperature conditions (25 to 200° C.) for measurement of ionic conductivity.

In addition, the upper spring 84 may be formed to have a desired spring constant (N/mm), and may be mounted in the upper barrel 81 of the upper probe pin 80 so as to be replaceable.

As can be easily seen from FIGS. 5 to 8, the lower probe pin 90 may include a lower barrel 91, which is hollow and is fixedly mounted to the lower support frame 70 while penetrating the same in the vertical direction, a lower plunger 93, which has a lower end portion inserted into the upper portion of the lower barrel 91 and an upper end portion having lower teeth 92 formed thereon to minimize contact resistance with the specimen 100, a lower spring 94, which is inserted into the lower portion of the lower barrel 91 to elastically support the lower surface of the lower plunger 93, and a lower current-collecting bar 95, which is connected to the lower end portion of the lower plunger 93 so as to be in conductive contact with the lower end portion of the lower spring 94.

The lower spring 94 is compressed between the lower plunger 93 and the lower current-collecting bar 95 by the force with which the lower plunger 93 is pressed when the specimen support frame 43 is moved downwards in the state in which the lower teeth 92 of the lower plunger 93 are in contact with the specimen 100. Preferably, the lower spring 94 may be made of stainless steel having the same heat resistance and acid resistance as the lower probe pin 90 so as to withstand high-temperature conditions (25 to 200° C.) for measurement of ionic conductivity.

In addition, the lower spring 94 may be formed to have a desired spring constant (N/mm), and may be mounted in the lower barrel 91 of the lower probe pin 90 so as to be replaceable.

An electrochemical analyzer 200 is connected to the upper current-collecting bar 85 and to the lower current-collecting bar 95 via high-temperature cables. The electrochemical analyzer 200 applies current to the upper current-collecting bar 85 and to the lower current-collecting bar 95 to thereby measure and calculate ionic conductivity using the resistance value of the electrolyte membrane 103, which is the ion exchange membrane of the specimen 100, and to calculate the surface pressure applied to the specimen 100.

Although it has been described above that the ball plunger 60 is mounted in the lift plate 42 and the plurality of fixing recesses 13, into which the ball plunger 60 is selectively inserted, is formed in the rear surface of the main body frame 10, the present disclosure is not limited thereto. The ball plunger 60 may be mounted in the lift plate 42, and the plurality of fixing recesses 13 may be formed in the slide shaft 50. Alternatively, the ball plunger 60 may be mounted to the slide shaft 50, and the plurality of fixing recesses 13 may be formed in the inner surface of the lift plate 42.

Hereinafter, the operation of the ionic conductivity measurement device of the present disclosure configured as described above will be described.

Referring to FIG. 2, when the handle portion 21 of the clamp handle 20 is pivoted to the uppermost position, the lift shaft 30 is moved to the uppermost position, and the motion jig 40, which is connected to the lift shaft 30, is also moved to the uppermost position.

Accordingly, the upper support frame 41, the specimen support frame 43, and the lift plate 42 of the motion jig 40 are located at the uppermost position.

In this case, the ball 62 of the ball plunger 60, which is mounted in the lift plate 42, is inserted into the uppermost one of the plurality of fixing recesses 13 formed in the main body frame 10, and thus upward and downward movement of the motion jig 40 is prevented.

The coin cell 110 is inserted into and seated in the coin cell seating recess 45 in the specimen support frame 43. The upper surface of the specimen 100 in the coin cell 110 is exposed upwards through the upper exposure hole 115, and the lower surface of the specimen 100 in the coin cell 110 is exposed downwards through the lower exposure hole 112.

As shown in FIG. 2, because the motion jig 40 is located at the uppermost position, the upper teeth 82 of the upper plunger 83 of the upper probe pin 80, which is mounted to the upper support frame 41, are spaced apart from the upper surface of the specimen 100, and the lower teeth 92 of the lower plunger 93 of the lower probe pin 90, which is mounted to the lower support frame 70, are also spaced apart from the lower surface of the specimen 100.

Thereafter, when the handle portion 21 of the clamp handle 20 is pivoted downwards, as shown in FIGS. 3 and 4, the upper hinge end 23 and the lower hinge end 25 are pivoted downwards to push the lift shaft 30 downwards. Accordingly, the lift shaft 30 is moved vertically downwards.

Subsequently, the motion jig 40, which is connected to the lift shaft 30, is also moved downwards together with the lift shaft 30, and the lift plate 42 of the motion jig 40 is also moved downwards.

Subsequently, the ball 62 of the ball plunger 60, which is mounted in the lift plate 42, is separated from the uppermost one of the plurality of fixing recesses 13 formed in the main body frame 10, and is inserted into one of the fixing recesses 13 below the uppermost one thereof.

For example, as shown in FIG. 3, the ball 62 of the ball plunger 60, which is mounted in the lift plate 42, may be inserted into the fourth fixing recess 13 from the top, among the plurality of fixing recesses 13 formed in the main body frame 10. Alternatively, as shown in FIG. 4, the ball 62 of the ball plunger 60, which is mounted in the lift plate 42, may be inserted into the lowermost one of the plurality of fixing recesses 13 formed in the main body frame 10.

At the same time, the upper teeth 82 of the upper plunger 83 of the upper probe pin 80, which is mounted to the upper support frame 41, are pressed onto the upper surface of the specimen 100, and the lower teeth 92 of the lower plunger 93 of the lower probe pin 90, which is mounted to the lower support frame 70, are pressed onto the lower surface of the specimen 100, whereby a predetermined amount of pressure may be applied to the specimen 100.

When the ball 62 of the ball plunger 60, which is mounted in the lift plate 42, is sequentially inserted into the plurality of fixing recesses 13 from the uppermost fixing recess 13 to the lowermost fixing recess 13, the pressure that is applied to the specimen 100 may increase.

Hereinafter, an ionic conductivity measurement method of the present disclosure using the above-described device will be described.

Figure 7:
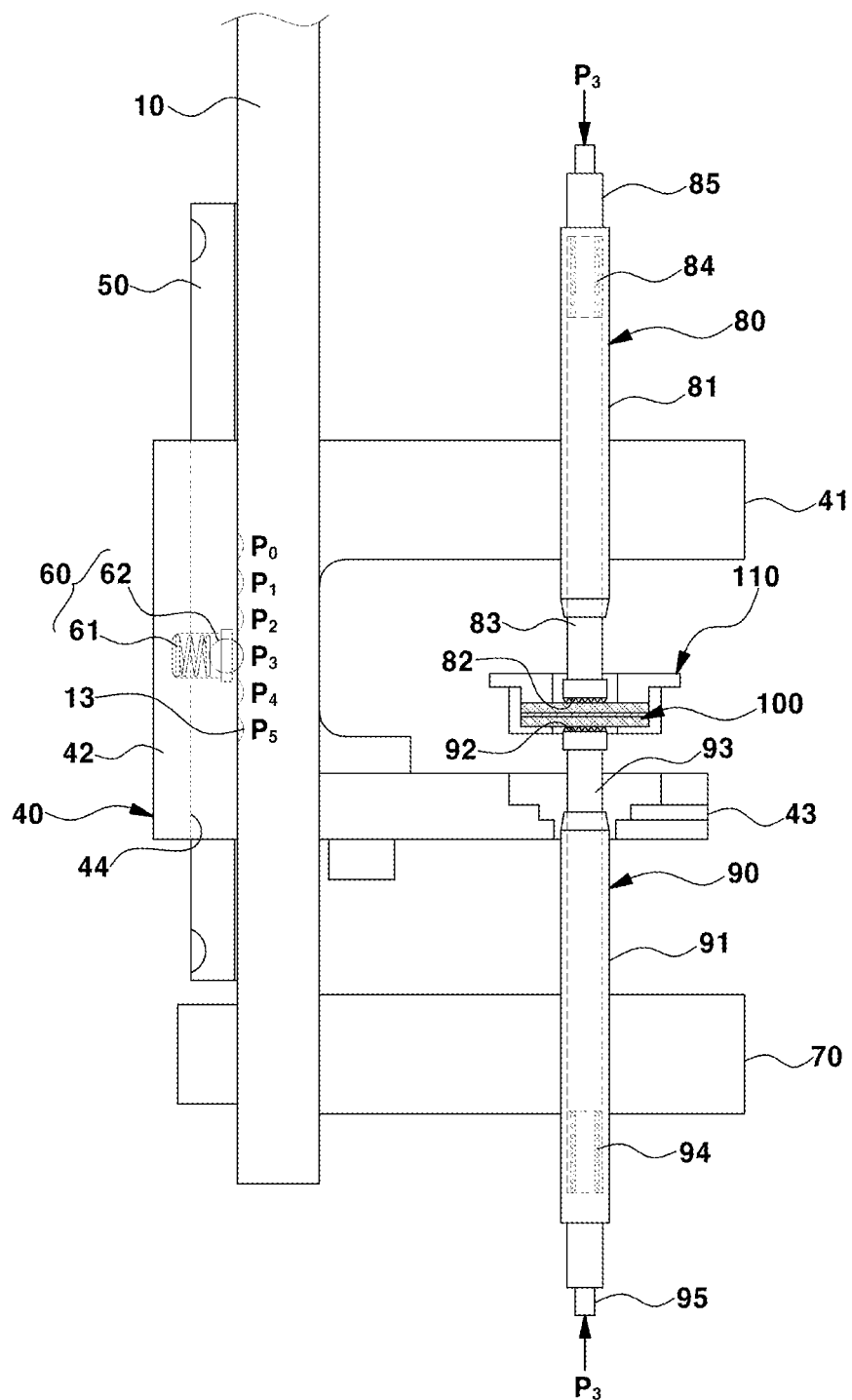
FIG. 7 is a cross-sectional view showing a change in the pressure that is applied to a specimen by operation of an upper probe pin and a lower probe pin of the ionic conductivity measurement device for a fuel cell according to the present disclosure.
Figure 8:
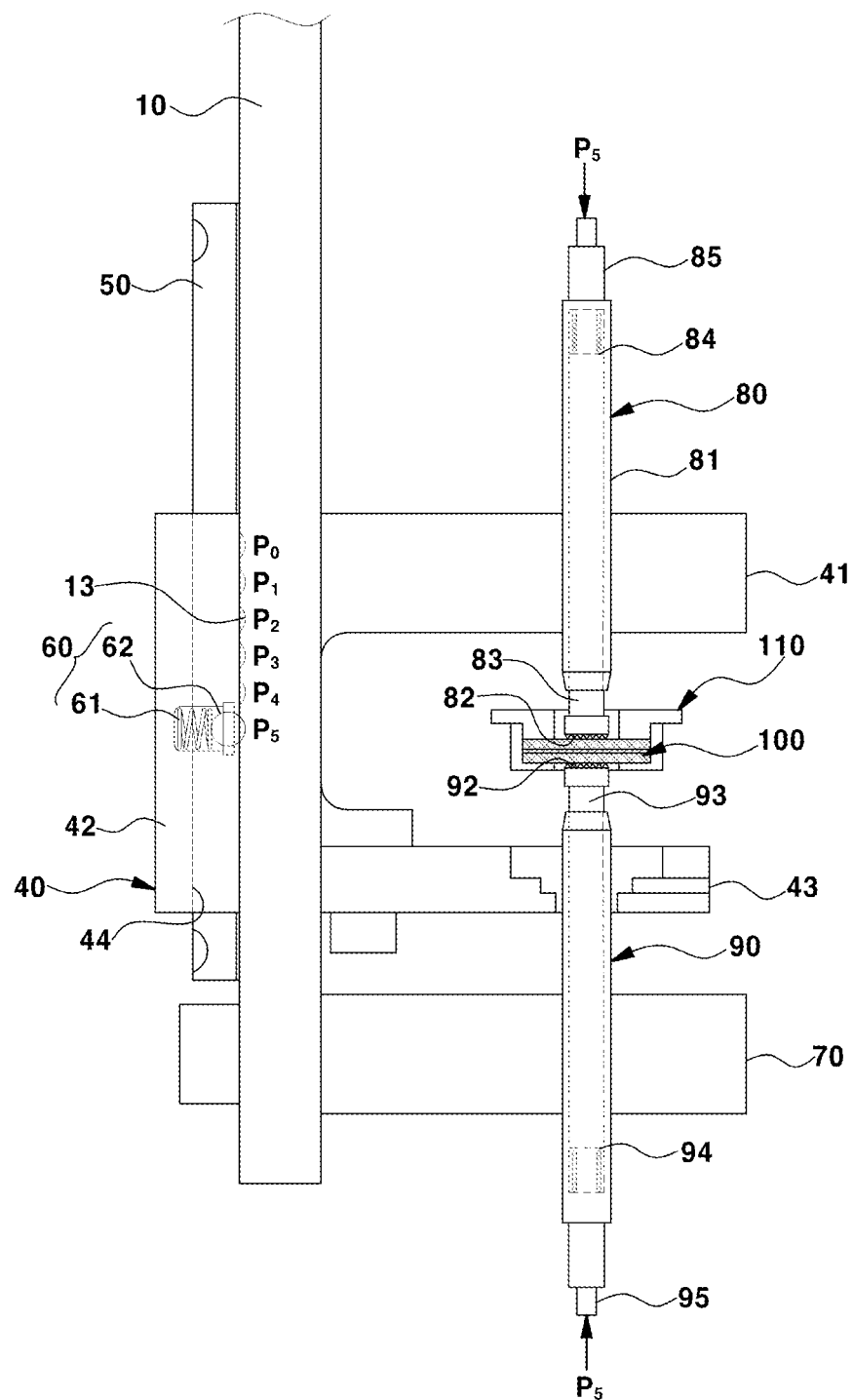
FIG. 8 is a cross-sectional view showing a change in the pressure that is applied to a specimen by operation of an upper probe pin and a lower probe pin of the ionic conductivity measurement device for a fuel cell according to the present disclosure.
Figure 9:
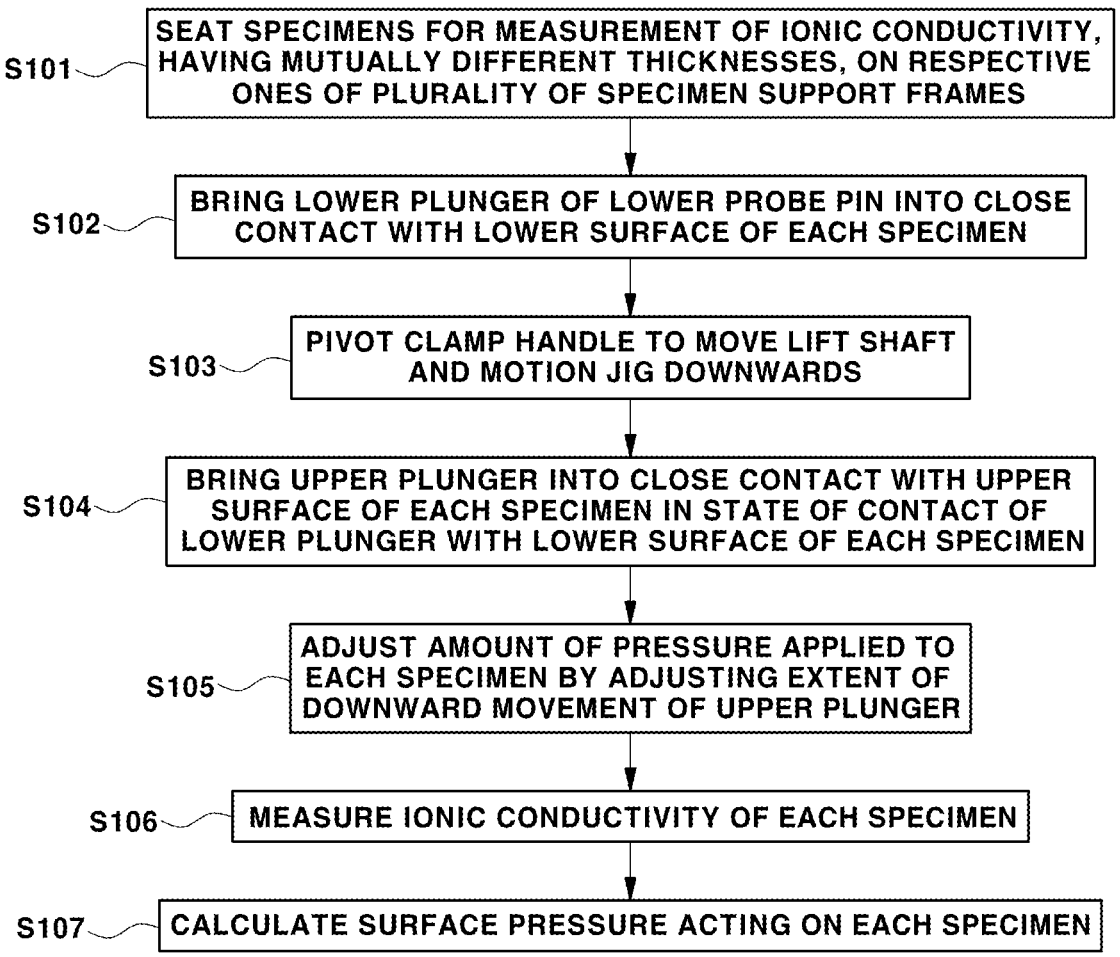
FIG. 9 is a flowchart showing an ionic conductivity measurement method for a fuel cell according to the present disclosure.

FIGS. 5 to 8 are cross-sectional views showing a change in the pressure that is applied to the specimen by operation of the upper probe pin and the lower probe pin of the ionic conductivity measurement device for a fuel cell according to the present disclosure, and FIG. 9 is a flowchart showing an ionic conductivity measurement method for a fuel cell according to the present disclosure.

First, each of the specimens 100, for which ionic conductivity is to be measured and which have mutually different thicknesses, is seated on a respective one of a plurality of specimen support frames 43 (S101).

The lower plunger 93 of the lower probe pin 90, which is mounted to the lower support frame 70 of the main body frame 10, is brought into close contact with the lower surface of each of the specimens (S102).

Subsequently, the clamp handle 20 is pivoted to move the lift shaft 30 downwards, and thus the motion jig 40 is also moved downwards (S103).

Accordingly, the upper plunger 83 of the upper probe pin 80, which is mounted to the upper support frame 41 of the motion jig 40, is moved downwards so that the upper teeth 82 are brought into close contact with the upper surface of each of the specimens 100, and the lower teeth 92 of the lower plunger 93 of the lower probe pin 90, which is mounted to the lower support frame 70, are brought into close contact with and support the lower surface of each of the specimens 100 (S104).

Therefore, the upper teeth 82 of the upper plunger 83 of the upper probe pin 80, which is mounted to the upper support frame 41, are pressed onto the upper surface of each of the specimens 100, and the lower teeth 92 of the lower plunger 93 of the lower probe pin 90, which is mounted to the lower support frame 70, are pressed onto the lower surface of each of the specimens 100, whereby a predetermined amount of pressure may be applied to each of the specimens 100.

The amount of pressure applied to each of the specimens 100 may be adjusted by moving the motion jig 40 and the upper plunger 83 downwards (S105).

That is, the amount of pressure applied to each of the specimens 100 may be adjusted by selectively inserting the ball plunger 60, which is mounted in the lift plate 42 of the motion jig 40, into one of the plurality of fixing recesses 13 formed in the rear surface of the main body frame 10.

In other words, when the ball 62 of the ball plunger 60, which is mounted in the lift plate 42, is sequentially inserted into each of the plurality of fixing recesses 13 formed in the rear surface of the main body frame 10 from the uppermost fixing recess 13 to the lowermost fixing recess 13, the pressure that is applied to the specimen 100 may increase.

Figure 5:
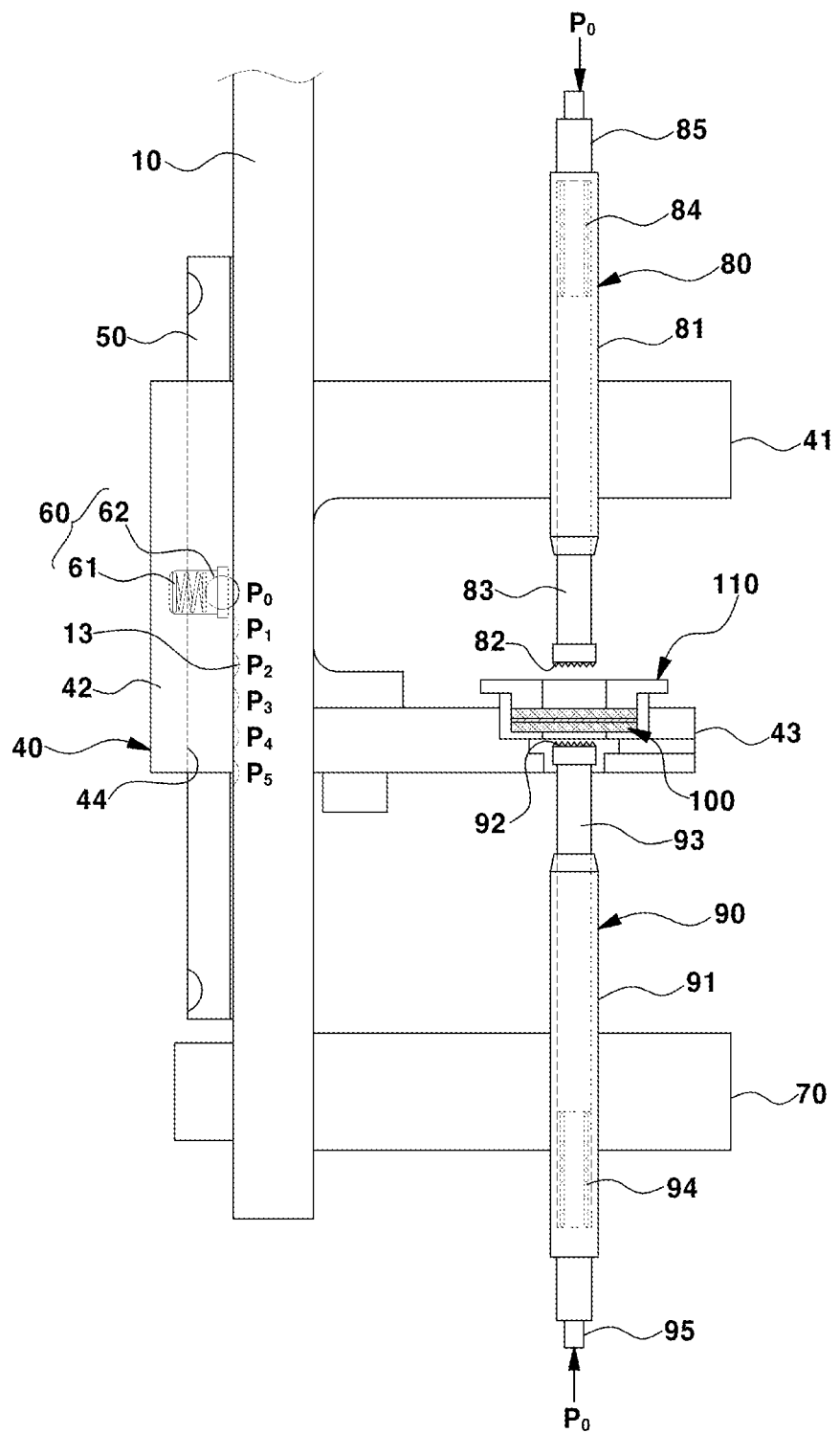
FIG. 5 is a cross-sectional view showing a change in the pressure that is applied to a specimen by operation of an upper probe pin and a lower probe pin of the ionic conductivity measurement device for a fuel cell according to the present disclosure.
Figure 6:
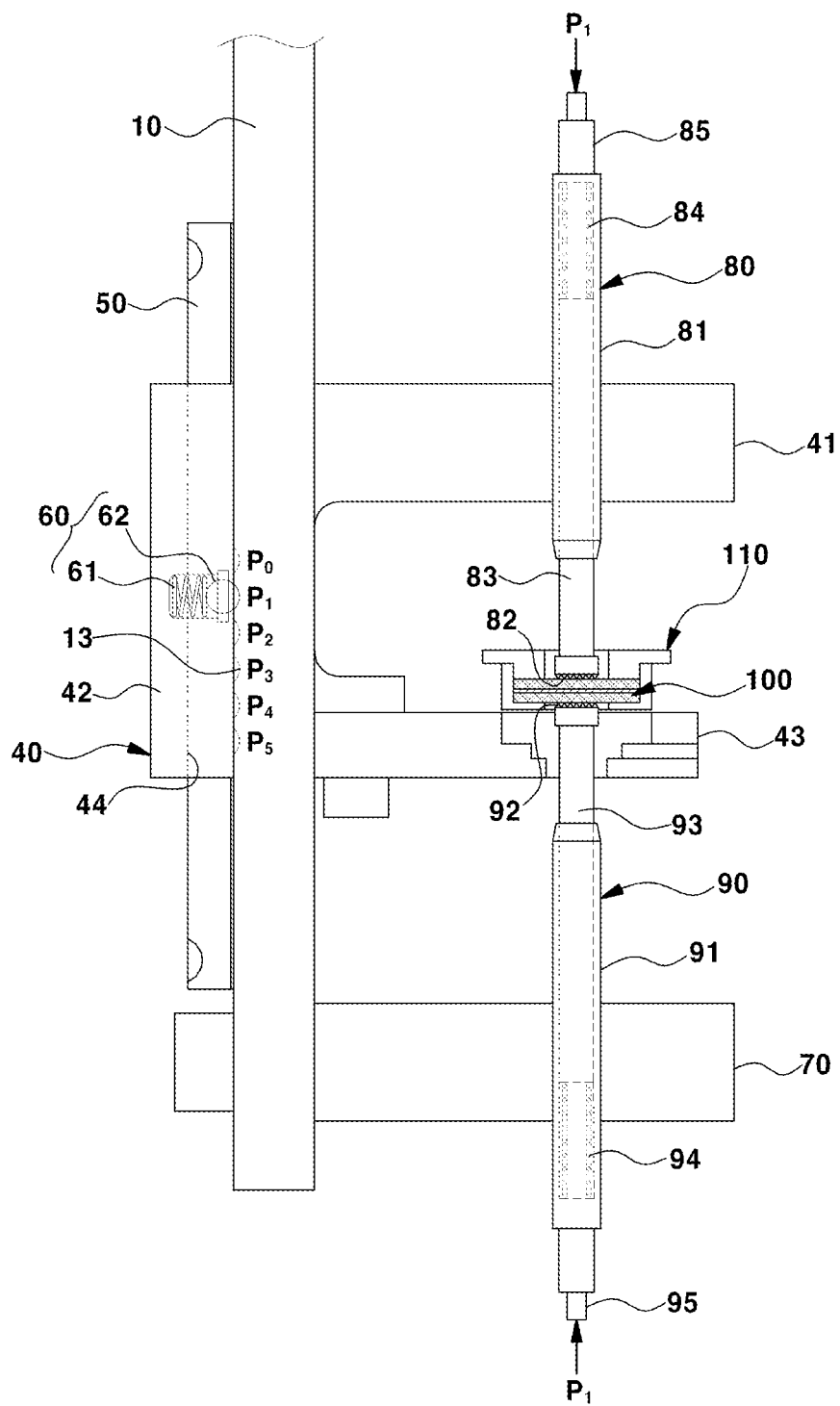
FIG. 6 is a cross-sectional view showing a change in the pressure that is applied to a specimen by operation of an upper probe pin and a lower probe pin of the ionic conductivity measurement device for a fuel cell according to the present disclosure.

For example, as shown in FIG. 5, when the ball 62 of the ball plunger 60, which is mounted in the lift plate 42, is inserted into the uppermost one of six fixing recesses 13 formed in the rear surface of the main body frame 10, the amount of pressure applied to the specimen 100 may be zero ($P_0$), that is, no pressure may be applied to the specimen 100. As shown in FIG. 6, when the ball 62 of the ball plunger 60, which is mounted in the lift plate 42, is inserted into the second fixing recess 13 from the top, among the six fixing recesses 13, the amount of pressure applied to the specimen 100 may be $P_1$.

As shown in FIG. 7, when the ball 62 of the ball plunger 60, which is mounted in the lift plate 42, is inserted into the fourth fixing recess 13 from the top, among the six fixing recesses 13, the amount of pressure applied to the specimen 100 may be $P_3$, which is greater than $P_1$. As shown in FIG. 8, when the ball 62 of the ball plunger 60, which is mounted in the lift plate 42, is inserted into the lowermost one of the six fixing recesses 13, the amount of pressure applied to the specimen 100 may be $P_5$, which is greater than $P_3$.

When the upper plunger 83 of the upper probe pin 80 and the lower plunger 93 of the lower probe pin 90 increasingly press the specimen 100, the upper spring 84 in the upper barrel 81 of the upper probe pin 80 and the lower spring 94 in the lower barrel 91 of the lower probe pin 90 are increasingly compressed.

Preferably, the upper spring 84 may be formed to have a desired spring constant (N/mm), and may be mounted in the upper barrel 81 of the upper probe pin 80 so as to be replaceable, and the lower spring 94 may be formed to have a desired spring constant (N/mm), and may be mounted in the lower barrel 91 of the lower probe pin 90 so as to be replaceable.

When the upper spring 84 and the lower spring 94, which have mutually different spring constants (N/mm), are used, a spring deflection and a spring load may be adjusted depending on the position at which the ball plunger 60 of the lift plate 42 of the motion jig 40 is fixed, as shown in Table 1 below.

mutually different spring constants (N/mm), are used, when the ball plunger 60 of the lift plate 42 of the motion jig 42 is moved downwards by downward pivoting of the clamp handle and is selectively inserted into one of the six fixing recesses 13 formed in the rear surface of the main body frame 10, the spring compression deflection and the spring load change. Accordingly, it is possible to variously adjust the amount of pressure that is applied to the specimen 100.

The ionic conductivity of the specimen 100 is measured under various different pressure conditions applied to the specimen 100 (S106).

The ionic conductivity may be measured by measuring the resistance value of the electrolyte membrane 103, which is the ion exchange membrane included in the specimen 100, when the electrochemical analyzer 200, which is connected to the upper probe pin 80 and the lower probe pin 90, applies current to the specimen 100 through the upper probe pin 80 and the lower probe pin 90.

Preferably, after measuring the resistance value of the electrolyte membrane 103, which is the ion exchange membrane included in the specimen 100, the electrochemical analyzer 200 may calculate the ionic conductivity of the specimen using Equation 1 below.

$$\sigma(S/cm) = \frac{t(cm)}{R(\Omega)A(cm^2)} \qquad \text{[Equation 1]}$$

In Equation 1 above, "$\sigma$" represents ionic conductivity, "t" represents the thickness of the specimen, "R" represents resistance, and "A" represents the area of the specimen.

In addition, a step of calculating the surface pressure acting on the specimen 100 may be further performed (S107).

The reason for calculating the surface pressure acting on the specimen 100 is to estimate the clamping surface pressure of a fuel cell stack that includes a membrane electrode assembly.

Preferably, the surface pressure acting on the specimen 100 may be calculated using Equation 2 below.

$$P_A(kg/cm^2) = \frac{k(N/mm) \times \delta(mm)}{A(m^2)} \times 1.0197 \times 10^5 \left(\frac{kg/cm^2}{N/m^2}\right) \qquad \text{[Equation 2]}$$

TABLE 1

| Classification | | Ch1 | | Ch2 | | Ch3 | | Ch4 | | Ch5 | |
|---|---|---|---|---|---|---|---|---|---|---|---|
| | | \multicolumn{10}{c}{Spring Constant (N/mm)} |
| | | 0.5 | | 0.5 | | 1.0 | | 2.0 | | 2.5 | |
| | | \multicolumn{10}{c}{Spring Length (mm)} |
| | | 25 | | 25 | | 25 | | 25 | | 25 | |
| | Position of Ball Plunger | Deflection (mm) | Load (N) | Deflection (mm) | Load (N) | Deflection (mm) | Load (N) | Deflection (mm) | Load (N) | Deflection (mm) | Load (N) |
| Spring Deflection and Spring Load | $P_1$ | 4 | 2.0 | 5 | 2.5 | 4 | 4.0 | 5 | 10.0 | 6 | 15.0 |
| | $P_2$ | 8 | 4.0 | 10 | 5.0 | 8 | 8.0 | 10 | 20.0 | 10 | 25.0 |
| | $P_3$ | 12 | 6.0 | 15 | 7.5 | 12 | 12.0 | 15 | 30.0 | 14 | 35.0 |
| | $P_4$ | 16 | 8.0 | 20 | 10.0 | 16 | 16.0 | 20 | 40.0 | 18 | 45.0 |
| | $P_5$ | 20 | 10.0 | — | — | 20 | 20.0 | — | — | — | — |

As can be seen from Table 1 above, in the case in which the upper spring 84 and the lower spring 94, which have In Equation 2 above, "$P_A$" represents the surface pressure, "k" represents the spring constant of each of the springs mounted in the upper probe pin and the lower probe pin, "δ" represents the deflection of each of the springs mounted in the upper probe pin and the lower probe pin, and "A" represents the area of the specimen.

TEST EXAMPLE

The amount of pressure that is applied to the specimen 100 is adjusted by sequentially inserting the ball 62 of the ball plunger 60, which is mounted in the lift plate 42, into the six fixing recesses 13 formed in the rear surface of the main body frame 10.

When the ball 62 of the ball plunger 60 is inserted into the uppermost one of the six fixing recesses 13 formed in the rear surface of the main body frame 10, the amount of pressure applied to the specimen 100 is $P_0$, that is, no pressure is applied to the specimen 100. This state is the state in which the upper probe pin 80 and the lower probe pin 90 are not in contact with the specimen 100 and thus data measurement is impossible.

When the ball 62 of the ball plunger 60 is inserted into the second fixing recess 13 from the top, among the six fixing recesses 13, the amount of pressure applied to the specimen 100 is $P_1$. When the ball 62 of the ball plunger 60 is inserted into the third fixing recess 13 from the top, among the six fixing recesses 13, the amount of pressure applied to the specimen 100 is $P_2$, which is greater than $P_1$. When the ball 62 of the ball plunger 60 is inserted into the fourth fixing recess 13 from the top, among the six fixing recesses 13, the amount of pressure applied to the specimen 100 is $P_3$, which is greater than $P_2$.

When the ball 62 of the ball plunger 60 is inserted into the fifth fixing recess 13 from the top, among the six fixing recesses 13, the amount of pressure applied to the specimen 100 is $P_4$, which is greater than $P_3$. When the ball 62 of the ball plunger 60 is inserted into the sixth fixing recess 13 from the top, i.e. the lowermost fixing recess, among the six fixing recesses 13, the amount of pressure applied to the specimen 100 is $P_5$, which is greater than $P_4$.

As described above, the amount of pressure applied to the specimen 100 is adjusted within a range of $P_1$ to $P_5$, and the electrochemical analyzer 200 measures the resistance value of the electrolyte membrane 103, which is the ion exchange membrane included in the specimen 100, under the respective pressure conditions, and then calculates the ionic conductivity of the specimen using Equation 1 above. The result of the calculation is shown in FIG. 10.

Figure 10:
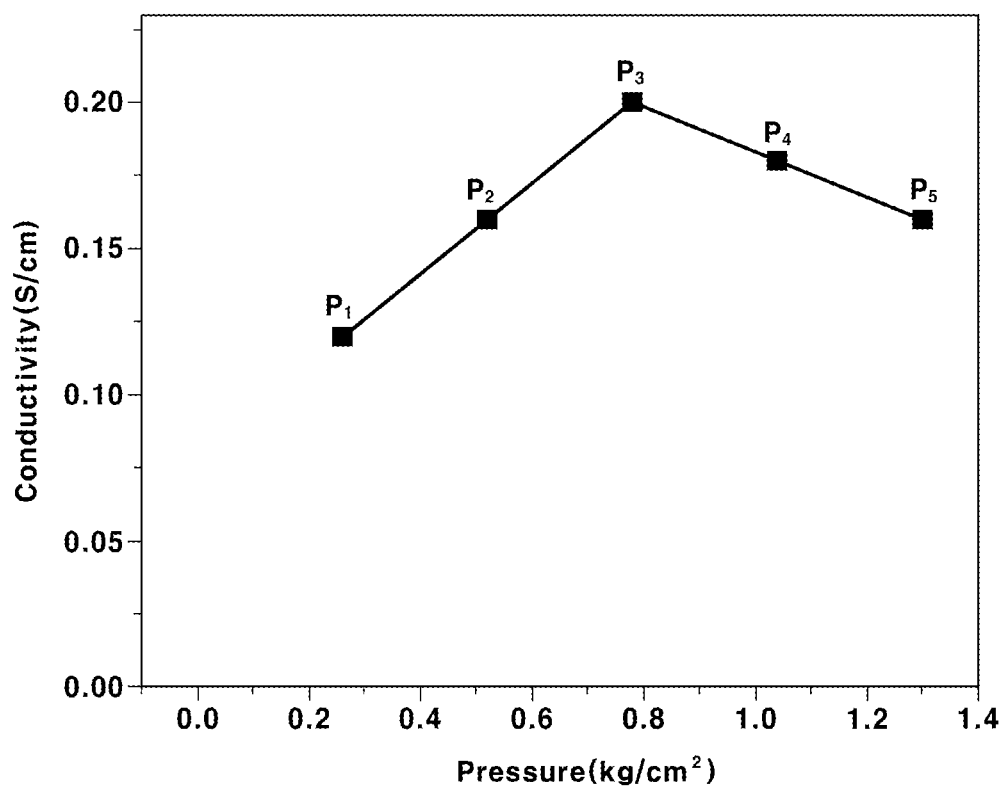
FIG. 10 is a graph showing an example of a result of measurement of the ionic conductivity of a fuel cell according to the present disclosure.

Referring to FIG. 10, it can be seen that when the amount of pressure applied to the specimen 100 increases from $P_1$ to $P_3$ ($P_1 \rightarrow P_2 \rightarrow P_3$), the interfacial contact resistance between the electrolyte membrane 103 and the electrode layers 101 and 102 of the specimen 100 decreases, and thus the ionic conductivity increases.

However, it can be seen that when the amount of pressure applied to the specimen 100 further increases from $P_3$ to $P_5$ ($P_3 \rightarrow P_4 \rightarrow P_5$), the ionic conductivity decreases. The reason for this is that the electrode layers 101 and 102 of the specimen 100 are compressed and thus are not capable of being used efficiently and that loss of ion transfer medium (e.g. phosphoric acid) occurs due to a phenomenon of squeezing out of the ion transfer medium (e.g. phosphoric acid).

As described above, since the ionic conductivity of the electrolyte membrane 103, which is the ion exchange membrane of the specimen 100, in the thickness direction is accurately measured under various temperature and pressure conditions, it is possible to calculate an optimal surface pressure for a membrane electrode assembly including an electrolyte membrane, i.e. an optimal clamping surface pressure at which a fuel cell stack including a membrane electrode assembly is clamped using end plates, and the calculated optimal clamping surface pressure may be used as useful data in the processes of manufacturing and assembling the fuel cell stack including the membrane electrode assembly.

As is apparent from the above description, the present disclosure has the following effects.

First, the ionic conductivity of an electrolyte membrane, which is an ion exchange membrane of a membrane electrode assembly constituting a fuel cell stack, has a thickness that may be accurately measured under various temperature and pressure conditions, and the measurement result may be used as useful data in the processes of manufacturing and assembling the fuel cell stack including the membrane electrode assembly.

Second, a plurality of jigs for measurement of ionic conductivity, which have the same configuration, may be mounted to a main body frame, and ionic conductivity may be measured by applying different amounts of pressure and supplying alternating-current power to specimens (electrolyte membranes having electrode layers applied thereto) supported by the respective jigs. Accordingly, it is possible to simultaneously measure the ionic conductivity of a plurality of specimens.

Third, the components of an upper probe pin and a lower probe pin, which are configured to be brought into contact with a specimen, are made of a heat-resistant and acid-resistant material (e.g. stainless steel), and accordingly, it is possible to easily measure the ionic conductivity of the specimen within a temperature range for measurement of ionic conductivity, e.g. from 25 to 200° C.

Fourth, springs having mutually different spring constants are used for the upper probe pin and the lower probe pin, and accordingly, it is possible to apply various amounts of pressure to the specimen and to accurately measure ionic conductivity, which varies depending on changes in pressure.

Although experimental examples and embodiments of the present disclosure have been illustrated and described in detail, the present disclosure is not limited thereto. It will be understood that various modifications and changes can be made by those skilled in the art without departing from the spirit and scope of the disclosure as defined by the appended claims.

What is claimed is:

1. An ionic conductivity measurement device for a fuel cell, comprising:
   a main body frame mounted onto a lower base frame so as to stand upright;
   a plurality of clamp handles mounted to an upper end portion of the main body frame;
   a lift shaft connected to each of the plurality of clamp handles so as to be movable upwards and downwards;
   a motion jig mounted to the main body frame so as to be movable upwards and downwards, the motion jig comprising an upper support frame connected to a lower end portion of the lift shaft and a specimen support frame integrally connected to the upper support frame;
   a lower support frame mounted and fixed to a lower end portion of the main body frame;
   an upper probe pin mounted to the upper support frame and configured to be brought into contact with an upper surface of a specimen seated on the specimen support frame when the upper support frame is moved in a downward direction; and a lower probe pin mounted to the lower support frame and configured to be in contact with a lower surface of the specimen seated on the specimen support frame.

2. The ionic conductivity measurement device of claim 1, wherein each of the plurality of clamp handles comprises:
a handle portion configured to be gripped by a user;
an upper hinge end extending from the handle portion and hinged to the main body frame; and
a lower hinge end branching from the upper hinge end and hinged to an upper end portion of the lift shaft.

3. The ionic conductivity measurement device of claim 1, further comprising:
a guide pipe mounted on a front surface of an upper portion of the main body frame to guide upward and downward movement of the lift shaft.

4. The ionic conductivity measurement device of claim 1, wherein the main body frame has a through-hole formed therein to guide upward and downward movement of the motion jig.

5. The ionic conductivity measurement device of claim 4, wherein the motion jig further comprises a lift plate integrally interconnecting the upper support frame and the specimen support frame, and
wherein the lift plate extends through the through-hole and is located on a rear surface of the main body frame.

6. The ionic conductivity measurement device of claim 5, further comprising:
a slide shaft mounted on the rear surface of the main body frame so as to be oriented in an vertical direction to guide upward and downward movement of the lift plate,
wherein the lift plate has a slide hole formed therein to allow the slide shaft to be inserted thereinto.

7. The ionic conductivity measurement device of claim 5, further comprising:
a ball plunger mounted in the lift plate; and
a plurality of fixing recesses formed in the rear surface of the main body frame so as to be spaced apart from each other at predetermined intervals in an vertical direction,
wherein the ball plunger is selectively inserted into one of the plurality of fixing recesses.

8. The ionic conductivity measurement device of claim 1, wherein the specimen support frame has a coin cell seating recess formed therein to allow a coin cell, configured to fix and protect the specimen, to be seated therein.

9. The ionic conductivity measurement device of claim 8, wherein the coin cell comprises:
a case seated in the coin cell seating recess, the case having an open upper portion, a support surface formed on a periphery of a bottom thereof to allow the specimen to be seated thereon, and a lower exposure hole formed in a center of the bottom thereof to expose a lower surface of the specimen, the specimen being an ion exchange membrane having electrodes applied to both surfaces thereof; and
a cap having a fixing end, formed on a lower surface thereof so as to be inserted into the case to press and fix a periphery of the specimen, and an upper exposure hole, formed in a center thereof to expose an upper surface of the specimen.

10. The ionic conductivity measurement device of claim 8, wherein the specimen support frame has an insertion hole formed therein to allow an upper end portion of the lower probe pin to be inserted thereinto so as to come into contact with a lower surface of the specimen.

11. The ionic conductivity measurement device of claim 1, wherein the upper probe pin comprises:
an upper barrel formed to be hollow and to penetrate the upper support frame in an vertical direction so as to move upwards and downwards together with the upper support frame;
an upper plunger having an upper end portion inserted into a lower portion of the upper barrel and a lower end portion having upper teeth formed thereon to minimize contact resistance with the specimen;
an upper spring inserted into an upper portion of the upper barrel to elastically support an upper surface of the upper plunger; and
an upper current-collecting bar connected to the upper end portion of the upper plunger so as to be in conductive contact with an upper end portion of the upper spring.

12. The ionic conductivity measurement device of claim 11, wherein the upper spring is compressed between the upper plunger and the upper current-collecting bar by downward movement force of the upper barrel and the upper current-collecting bar when the upper support frame is moved downwards in a state of contact of the upper teeth of the upper plunger with the specimen, and is made of heat-resistant stainless steel.

13. The ionic conductivity measurement device of claim 1, wherein the lower probe pin comprises:
a lower barrel formed to be hollow and to penetrate the lower support frame in an vertical direction so as to be fixedly mounted thereto;
a lower plunger having a lower end portion inserted into an upper portion of the lower barrel and an upper end portion having lower teeth formed thereon to minimize contact resistance with the specimen;
a lower spring inserted into a lower portion of the lower barrel to elastically support a lower surface of the lower plunger; and
a lower current-collecting bar connected to the lower end portion of the lower plunger so as to be in conductive contact with a lower end portion of the lower spring.

14. The ionic conductivity measurement device of claim 13, wherein the lower spring is compressed between the lower plunger and the lower current-collecting bar by force of pressing the lower plunger when the specimen support frame is moved downwards in a state of contact of the lower teeth of the lower plunger with the specimen, and is made of heat-resistant stainless steel.

* * * * *